Oct. 7, 1924.

W. G. PANCOAST

AUTOMOBILE BUMPER

Filed Jan. 31, 1923

1,511,039

Inventor,
William G. Pancoast,

Patented Oct. 7, 1924.

1,511,039

UNITED STATES PATENT OFFICE.

WILLIAM G. PANCOAST, OF WILMETTE, ILLINOIS, ASSIGNOR TO BIFLEX PRODUCTS COMPANY, OF WAUKEGAN, ILLINOIS, A CORPORATION OF DELAWARE.

AUTOMOBILE BUMPER.

Application filed January 31, 1923. Serial No. 616,022.

*To all whom it may concern:*

Be it known that I, WILLIAM G. PANCOAST, a citizen of the United States, and a resident of Wilmette, in the county of Cook and State of Illinois, have invented certain new and useful Improvements in Automobile Bumpers, of which the following is a specification.

This invention relates to improvements in bumpers for automobiles, and more particularly to bumpers of that type constructed of resilient bars spaced apart or offset vertically so as to provide an impact area of increased width, especially pronounced throughout the central portion of the impact member.

The object of the invention is to provide a novel construction for a bumper embodying the characteristics hereinbefore set forth, and one of simple construction with but few parts, comprising two bars so offset and crossed and overlapped as to form braced yet resilient construction, but suited to withstand the impacts to which automobile bumpers are subjected.

It is a further object of the invention to provide a novel treatment of the bars in forming the widened impact member and the rear reinforcing bar by which the bumper is attached to the vehicle.

In the accompanying drawings a preferred embodiment of the invention is disclosed, and wherein—

Figure 1:
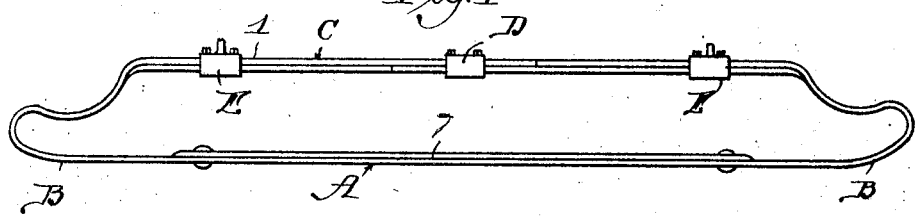
Figure 2:
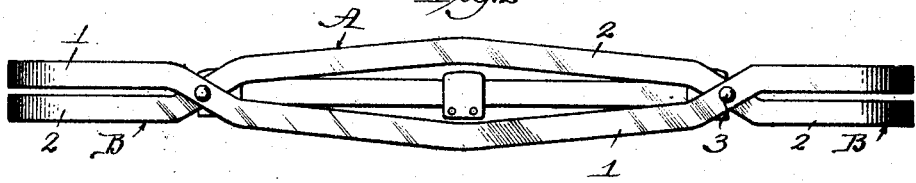
Figure 3:
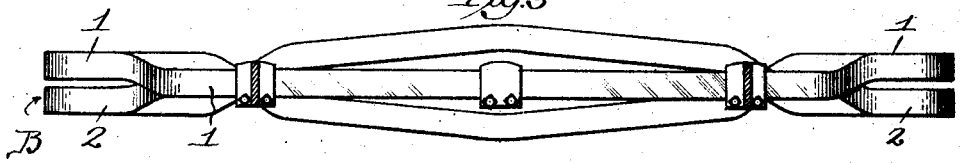
Figure 4:
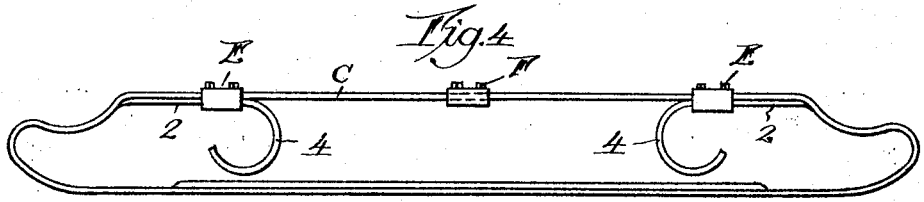
Figure 5:
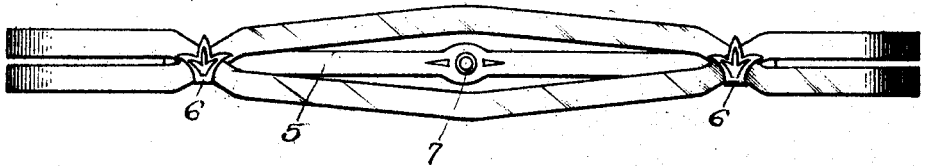

Fig. 1 is a top plan view of the bumper showing a preferred treatment of the bars and method of attaching the bumper, Fig. 2 is a view in front elevation of the bumper, Fig. 3 is a view in rear elevation of the bumper, Fig. 4 is a top plan view of the bumper showing a modified construction, and Fig. 5 is a view in front elevation of the bumper with an added feature in the form of an auxiliary bar.

The bumper herein disclosed, and presently to be described in detail, may be said to be made up of two flat bars extending in vertically spaced relation throughout the impact member and in overlapping engagement throughout the rear portion. Resilient material, such as spring steel in the form of flat bar stock, is preferably used. These bars 1 and 2 are for the most part counterparts of each other and when assembled form a symmetrical structure, consisting of a forward and centrally located impact section A, end sections B, B, extending outwardly from the ends of the central impact section A, and bent to form loops or U-shaped extremities at the ends of the bumper. Beyond the looped end sections B, B the bars 1 and 2 are brought together in overlapping and flatwise contact to form a rear section C extending parallel with the forward or impact member of the bumper.

The individual bars 1 and 2 extend throughout all portions of the bumper and, with respect to the central impact portion A and end sections B, B, these bars extend substantially parallel with each other and in the same vertical plane. A parallel relationship is maintained throughout the U-shaped end portions B, B, which extend inwardly from the ends of the bumper at both front and rear. The central impact section A is formed by offsetting the central portions of the bars vertically in opposite directions and crossing the bars obliquely at points inwardly from each end, thereby affording a bracing effect at these points. Thus the bar 1, which is disposed above the end portions B, B, is offset downwardly at the points of intersection, thus becoming the lower bar of the central impact section A. Similarly, the bar 2, which is the lower bar throughout the end sections, is offset upwardly at the points of crossing or intersection and becomes the upper bar of the central impact section. Passing through the bars at the points of intersection are fastening members 3, 3, preferably in the form of rivets, although clamping members or other means of connection may be employed.

Throughout the central impact section A the portions of the bars 1 and 2 forming the same are separated vertically a greater distance than throughout the end portions B, B, in fact, they diverge slightly from the ends of said section, thus giving the same a somewhat oval shape. However, the portions of the bars forming this central impact area A may be shaped so that the section may be uniform in width substantially throughout its length, although the increased width is maintained in order to provide a larger impact area intermediate the ends of the bumper. Moreover, in the crossing of the bars at either end of the central impact area, it is necessary to offset the bars horizontally, as is shown in Fig. 2, with the result that the portions of the bars forming the central impact area A are not disposed in the same vertical plane. It would be possible, however, and perhaps desirable, to offset the bars throughout the intersecting portions so that the intermediate portions may be brought back into the same plane, this being merely a matter of design.

As before described, the end portions B, B have the form of loops which are provided by bending the bars rearwardly and inwardly, thus providing added resiliency in the structure. The rear bar or portion C is formed by extending the bars 1 and 2 inwardly beyond the end sections B, B, in the manner now to be described.

As hereinbefore explained, the bars 1 and 2 are spaced apart vertically and extend in parallel relation throughout the end portions B, B, this relationship being carried throughout the looped ends as far as the ends of the rear bar C. As clearly shown in Fig. 3, the bars 1 and 2 are offset abruptly toward each other at the junction of the end portions B, B, and the rear bar C, so that they are brought together in flatwise contact and form a bar of double thickness and of single width. As shown in Figs. 1 and 3, the upper bar 1 becomes the rearmost bar of the rear portion C, and the lower bar 2 becomes the foremost bar, although this arrangement may be reversed if desired.

The ends of the bars 1 and 2 are brought together in abutting engagement adjacent the mid-point of the rear bar C, although as a preferable construction the joints are located on opposite sides of this mid-point. In other words, the joints are staggered and a clamping member D is mounted between and at the center of the bar. On either side of the central clamping member and somewhat nearer the outer ends of the rear bar C are mounted a pair of clamping members E, E, which also form parts of two brackets which are adapted for attachment to the vehicle frame and form the supporting members for the bumper.

In Fig. 4 a modification of the bumper above disclosed has been illustrated. The modification or departure is confined to the treatment of the rear section C wherein the innermost bar 2 does not extend throughout the full length of said rear section C but terminates just beyond the clamping members E, E in two forwardly curved loops 4, 4, of substantially semi-circular shape, which extend in close proximity to the forward impact portion of the bumper. These loops constitute reinforcing springs which function to absorb a portion of the shock delivered against the impact portion of the bumper, it being manifest that the said forward portion of the bumper is distorted or yields under impact, thus striking the reinforcing loops, which in turn are depressed or slightly flattened, thus yieldingly resisting the distorting action.

In providing the loops 4, 4 the ends of the other bar 1 are carried inwardly as before, although their ends meet in abutting relation at the center where they are connected together by a single clamping member F.

In Fig. 5 a further modication has been illustrated showing the manner in which the appearance of the bumper may be improved and its strength increased. This is accomplished by the addition of an auxiliary bar 5 extending longitudinally of the central impact section A between the portions of the bars forming the same and within the space therebetween. This bar terminates at the points of intersection of the bars, its ends being preferably inserted between the bars 1 and 2 at said points of intersection and secured in place by the rivet 3 heretofore described, or by means of a clamping member 6 surrounding the three overlapping bars.

If desired, the appearance of the bumper may be enhanced by providing a decorative bar having some conventional design, such as shown at 7, at the center of the impact section. Moreover, the clamping members 6, 6, or rivet heads may be fashioned in some conventional design in place of the plain rivets or clamps. These decorative features are disclosed as a means of satisfying a prevailing tendency toward enhancing the otherwise plain appearance of bumpers.

A bumper of the type herein disclosed presents a novel treatment of the so-called double bar construction wherein the desirable qualities of increased strength and protection are obtained throughout those portions where these qualities are required, and without sacrificing the appearance or utility of the bumper.

I claim as my invention—

1. A bumper comprising resilient bars extending in vertically spaced relation and bent in U-shape throughout the end portions thereof, and thence offset vertically into flatwise contact at points disposed inwardly from the ends of the bumper and forming portions of double thickness for connection to a vehicle.

2. A bumper comprising an impact member consisting of resilient bars spaced apart vertically and bent in U-shape at its ends, said bars being extended inwardly beyond said U-shaped ends and in flatwise contact, thereby providing rearwardly disposed portions of double thickness for attachment to a vehicle.

3. A bumper comprising resilient bars extending in vertically spaced relation throughout the central and end portions of the impact member thereof, and bent rearwardly and inwardly to form U-shaped ends, said bars being offset vertically beyond said U-shaped ends and brought into flatwise contact thereby forming rearwardly disposed portions of double thickness, and clamping members attached to said rearwardly disposed portions.

4. A bumper comprising an impact member having U-shaped end portions and consisting of a pair of resilient bars extending in vertically spaced relation throughout the central and end portions of said impact member and U-shaped end portions, said bars being brought together beyond said end portions into flatwise contact and forming a rearwardly disposed bar of double thickness and attaching members applied to said last mentioned bar.

5. A bumper comprising a pair of resilient bars extending throughout the length of the bumper and forming an impact member thereof, the end portions of said bars being spaced vertically apart and bent rearwardly and inwardly to form U-shaped ends, the end portions of said bars being brought together in flatwise contact beyond said U-shaped ends and into abutting engagement at their ends to form a rearwardly disposed bar of double thickness.

In witness whereof, I hereunto subscribe my name this 26th day of January, A. D., 1923.

WILLIAM G. PANCOAST.